(12) United States Patent
Kebukawa et al.

(10) Patent No.: US 9,985,510 B2
(45) Date of Patent: May 29, 2018

(54) PM STEPPING MOTOR

(71) Applicant: MINEBEA CO., LTD., KITASAKU-GUN, NAGANO (JP)

(72) Inventors: Koji Kebukawa, Kakegawa (JP); Yan Zhong, Fukuroi (JP)

(73) Assignee: Minebea Co., Ltd., Nagano (JP)

( * ) Notice: Subject to any disclaimer, the term of this patent is extended or adjusted under 35 U.S.C. 154(b) by 0 days. days.

(21) Appl. No.: 14/521,753

(22) Filed: Oct. 23, 2014

(65) Prior Publication Data

US 2015/0115750 A1    Apr. 30, 2015

(30) Foreign Application Priority Data

Oct. 24, 2013    (JP) .................................. 2013-221087

(51) Int. Cl.
*H02K 37/00* (2006.01)
*H02K 37/14* (2006.01)
*H02K 1/14* (2006.01)

(52) U.S. Cl.
CPC ............. *H02K 37/14* (2013.01); *H02K 1/145* (2013.01)

(58) Field of Classification Search
CPC ....................................................... H02K 37/14
USPC ........................................... 310/49.01–49.55
See application file for complete search history.

(56) References Cited

U.S. PATENT DOCUMENTS

| | | | | |
|---|---|---|---|---|
| 6,479,911 B1* | 11/2002 | Koike | .................... | H02K 1/145 310/257 |
| 7,679,258 B2* | 3/2010 | Hsiao | .................... | H02K 1/145 310/254.1 |
| 8,978,496 B2* | 3/2015 | Lee | ......................... | H02K 5/161 310/49.18 |
| 2014/0167534 A1* | 6/2014 | Hata | ....................... | H02K 5/15 310/49.01 |

FOREIGN PATENT DOCUMENTS

| | | |
|---|---|---|
| JP | 10-295070 A | 11/1998 |
| JP | 2007282479 A | 10/2007 |
| JP | 2013211967 A | 10/2013 |

OTHER PUBLICATIONS

Office Action issued Sep. 9, 2016 in the corresponding Japanese Patent Application No. 2013-221087.

* cited by examiner

*Primary Examiner* — Hanh Nguyen
(74) *Attorney, Agent, or Firm* — Carrier Blackman & Associates, P.C.; William D. Blackman; Jingli Wang

(57) ABSTRACT

A PM stepping motor includes a two-phase stator which includes first and stator stators, and a rotor which is rotatably supported inside the two-phase stator. Each of the first and second stators includes an outer yoke, an inner yoke and a coil. Each of the first and second stators is formed with a convex portion and a concave portion. The convex portion formed on the inner yoke of the first stator is engaged with the concave portion formed on the inner yoke of the second stator. The inner yoke is formed with two protrusions engaged with a cutout of the outer yoke. The convex portion (Continued)

and the concave portion are arranged line-symmetrically with respect to a center line passing through a center point of the inner yoke and a center position between the two protrusions, and an angle $\theta$ between each position and the center line ranges $30°<\theta<90°$.

10 Claims, 5 Drawing Sheets

PM STEPPING MOTOR

CROSS-REFERENCE TO RELATED APPLICATION

This application claims priority from Japanese Patent Application No. 2013-221087, filed on Oct. 24, 2013, the entire subject matter of which is incorporated herein by reference.

BACKGROUND OF THE INVENTION

1. Field of the Invention

The present invention relates to a PM stepping motor with reduced noise.

2. Description of the Related Art

Claw-pole Permanent Magnet (PM) stepping motors have been widely used in OA equipment, computer peripheral equipment, air-conditioning equipment and so on. The claw-pole PM stepping motor includes a stator and a rotor having a cylindrical permanent magnet. The rotor is held inside the stator in a rotatable state. The stator has a structure in which two sets of stator units are joined to each other. Here, the stator unit includes an inner yoke, an outer yoke and a coil disposed therebetween. Further, the stator is configured by joining two stator units in an axially overlapped manner such that the inner yokes thereof are arranged in a back to back relationship.

Further, each of the inner yoke and the outer yoke includes a plurality of pole teeth extending in an axial direction. The pole teeth of the inner yoke and the pole teeth of the outer yoke are alternately engaged with each other with a space therebetween. The rotor is rotatably positioned inside these pole teeth via a predetermined air gap. For example, JP-A-H10-295070 discloses the PM stepping motor having the above-described structure.

FIGS. 6 to 8 show the PM stepping motor disclosed in JP-A-R10-295070. As shown in FIGS. 6 to 8, a stator 2 has a structure where two stator units are overlapped in an axial direction. The stator unit is configured by an inner yoke 3, an outer yoke 4 and a coil 5 disposed therebetween. Here, the two stator units are joined in a state where the inner yokes 3 thereof are arranged in a back to back relationship. The outer yoke 4 is a cylindrical member made of soft magnetic material and includes a bottom portion 41 and a cylindrical outer peripheral portion 42. A plurality of pole teeth 44 are formed on an edge of an opening 43 which is formed in the center of the bottom portion 41. A cutout 45 is formed in the outer peripheral portion 42. A terminal portion 53 formed on a bobbin 51 passes through the cutout 45 and protrudes to the outside thereof.

The inner yoke 3 is a disc-shaped member made of soft magnetic material. A plurality of pole teeth 34 are formed on an edge of an opening 33 which is formed in the center of a base portion 31. A cutout 35 is formed in an outer peripheral portion of the base portion 31. The terminal portion 53 formed on the bobbin 51 is intended to protrude to the outside through the cutout 35. Further, the base portion 31 is formed with a protruding portion 37 and a hole 38, which are located at positions facing each other via the opening 33. The protruding portion 37 and the hole 38 are respectively engaged with the hole 38 and the protruding portion 37 of the other inner yoke 3, so that positioning and joining between the inner yokes 3 are performed.

When the claw-pole PM stepping motor 1 disclosed in JP-A-H10-295070 is driven, the rotor 6 is vibrated in an axial direction at the switching of energization to the coil 5, which causes generation of noise. Further, simultaneously, the stator 2 is also vibrated in a radial direction by electromagnetic force acting between a permanent magnet 62 of the rotor 6 and the pole teeth 34, 44, which causes generation of noise.

Here, in the PM stepping motor 1 disclosed in JP-A-H10-295070, the positioning between the inner yokes 3 is performed by the protruding portion 37 and the hole 38, which are formed on the inner yokes 3. The protruding portion 37 and the hole 38 are respectively formed at a position of 90° with respect to the cutout 35 through which the terminal portion 53 passes and protrudes to the outside. In this structure, there is a problem that rattling is likely to occur in the holding state of the inner yokes 3 and noise is likely to increase due to the vibration at driving.

SUMMARY

The present invention has been made in view of the above-described circumstances, and an object of the present invention is to reduce noise when a claw-pole PM stepping motor is driven.

According to an illustrative embodiment of the present invention, there is provided a PM stepping motor comprising: a two-phase stator which includes a first stator and a second stator arranged in an axial direction, wherein each of the first stator and the second stator configures one phase and includes an outer yoke having a plurality of pole teeth, an inner yoke having a plurality of pole teeth, and a coil wound around a bobbin; and a rotor which is rotatably supported inside the two-phase stator. Each of the first and second stators is formed with one set of a convex portion and a concave portion which have an engagement structure. The inner yoke of the first stator and the inner yoke of the second stator are joined while the convex portion formed on the inner yoke of the first stator being engaged with the concave portion formed on the inner yoke of the second stator. Each of the outer yoke of the first stator and the outer yoke of the second stator is formed with a cutout through which a terminal formed integrally with the bobbin protrudes outside. Each of the inner yoke of the first stator and the inner yoke of the second stator is formed at an outer peripheral edge thereof with two protrusions which are engaged with the cutout of the outer yoke of the corresponding one of the first stator and the second stator. Positions of the convex portion and the concave portion of the inner yokes of the first and second stators are arranged in a line symmetrical relationship with respect to a center line passing through a center point of the inner yokes and a center position between the two protrusions, and an angle θ formed between each of the positions and the center line is in the range of 30°<θ<90°.

According to the above configuration, occurrence of vibration at driving can be suppressed and noise can be reduced.

In the above PM stepping motor, the angle θ may be in the range of 40°<θ<85°.

According to this configuration, the noise at driving can be further reduced.

In the above PM stepping motor, the angle θ may be in the range of 55°<θ<70°.

According to this configuration, the noise at (hiving can be still further reduced.

DETAILED DESCRIPTION (Overall Structure)

Figure 1:
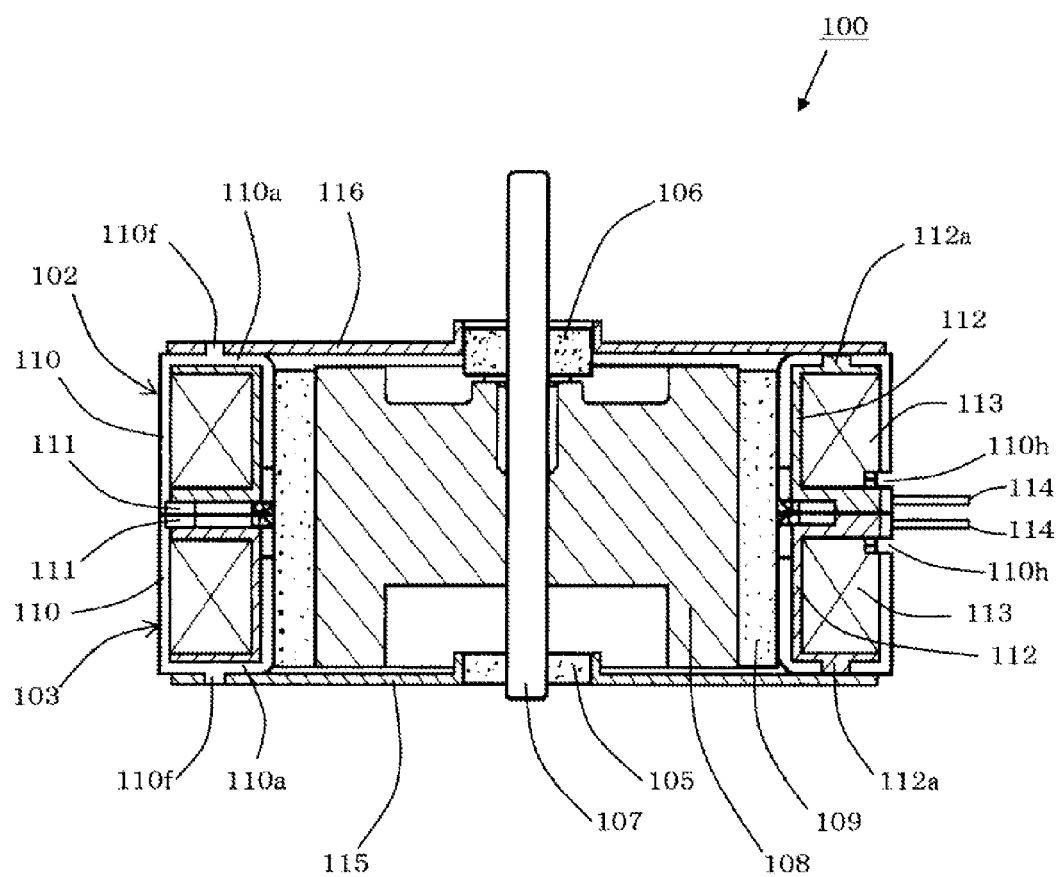
FIG. 1 is a sectional view showing a PM stepping motor according to an illustrative embodiment of the present invention.

Hereinafter, a PM stepping motor according to an illustrative embodiment of the present invention will be described with reference to the drawings. FIG. 1 shows a PM stepping motor 100 according to the illustrative embodiment. The PM stepping motor 100 is a claw-pole PM stepping motor. The PM stepping motor 100 includes a stator 101 (i.e., two-phase stator) having a two-phase (A-phase and B-phase) structure which is configured by an A-phase stator 102 and a B-phase stator 103. Here, the A-phase stator 102 is axially arranged on the B-phase stator 103. The A-phase stator 102 has the same structure as the B-phase stator 103. In a state of being axially inverted, the A-phase stator 102 and the B-phase stator 103 are joined in a back to back relationship, thereby configuring the stator 101. Inside the stator 101, a rotor 104 is disposed in a rotatable state relative to the stator 101 via bearings 105, 106 while having a predetermined air gap therebetween.

The rotor 104 includes a shaft 107, a sleeve 108 fixed to the shaft 107, and a cylindrical permanent magnet 109 which is a rotor magnet fixed to an outer peripheral surface of the sleeve 108. An outer peripheral surface of the permanent magnet 109 is magnetized such that polarities of magnetic poles are alternately reversed along a circumferential direction, e.g. in a form of SNSN . . . .

The A-phase stator 102 is configured by a cup-shaped outer yoke 110 (FIG. 3) made of soft magnetic material (e.g., a cold-rolled steel plate, an magnetic steel plate and so on), a disc-shaped inner yoke 111 (FIG. 2) made of soft magnetic material (e.g., a cold-rolled steel plate, an magnetic steel plate and so on), a bobbin 112 molded from insulative resin and a coil 113 wound around the bobbin 112.

Figure 3:
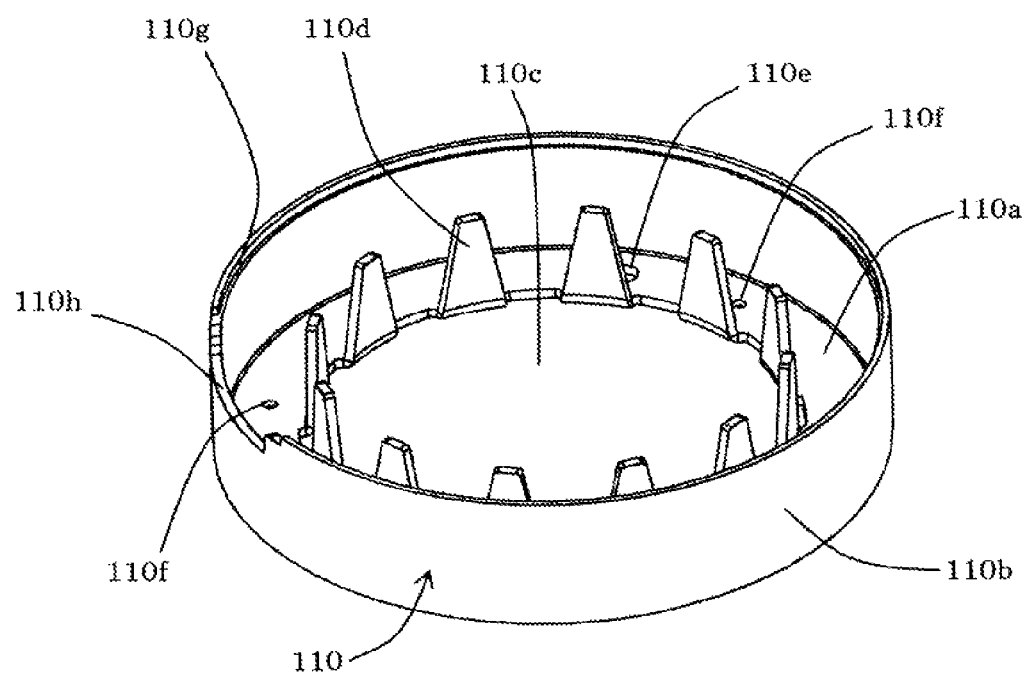
FIG. 3 is a perspective view showing an outer yoke shown in FIG. 1.

As shown in FIG. 3, the outer yoke 110 is configured by a bottom plate portion 110a and a cylindrical portion 110b. An opening 110c is formed in the center of the bottom plate portion 110a. At the peripheral edge of the opening 110c, a plurality of comb-shaped pole teeth 110d (in FIG. 3, twelve pole teeth) are formed at an equal interval. Further, the bottom plate portion 110a is formed with a plurality of positioning holes 110e and a plurality of protrusions 110f protruding outward in an axial direction. A stepped portion 110g is formed on the inner peripheral edge of an end portion of the cylindrical portion 110d, and a cutout 110h (a first cutout) is formed on the outer periphery thereof.

Figure 2:
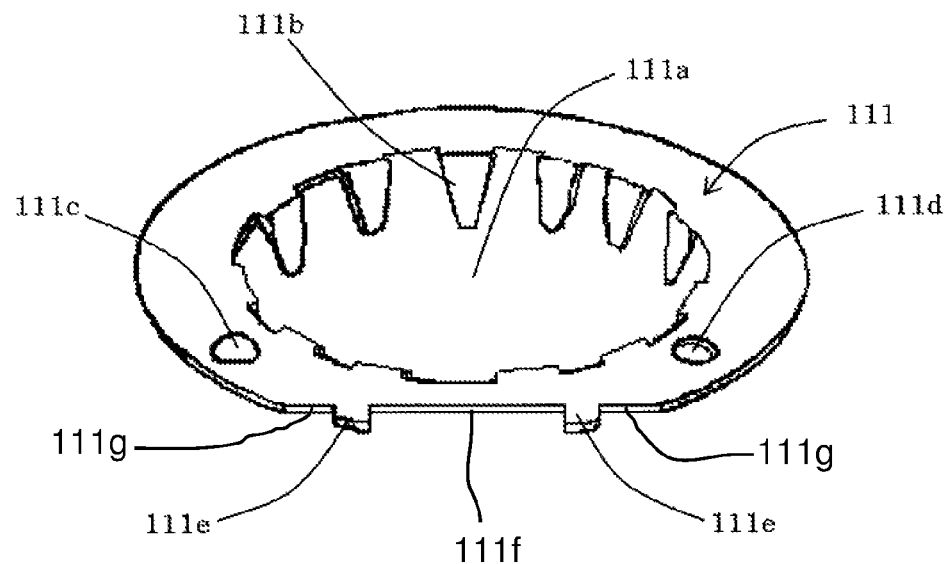
FIG. 2 is a perspective view showing an inner yoke shown in FIG. 1.
Figure 4:
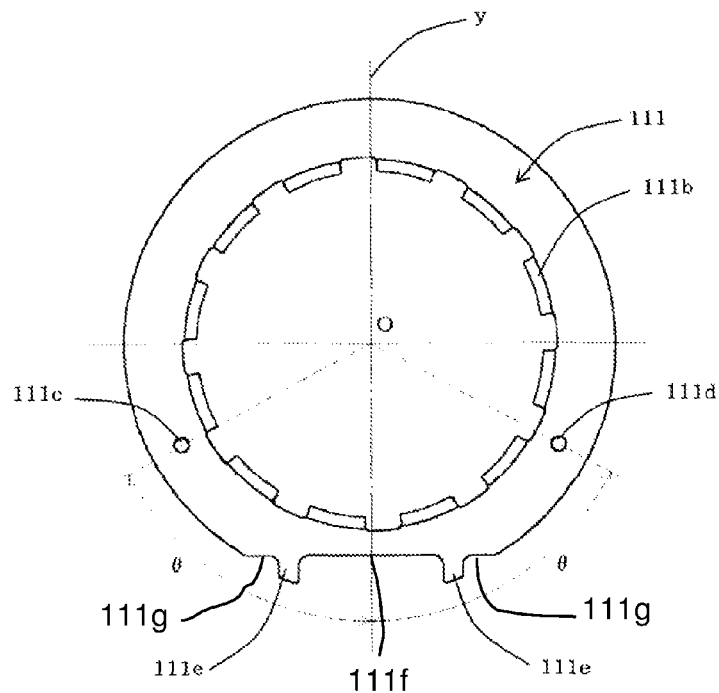
FIG. 4 is a plan view showing the inner yoke shown in FIG. 2.

As shown in FIG. 2, an opening 111a is formed in the center of the disc-shaped inner yoke 111. At the peripheral edge of the opening 111a, a plurality of comb-shaped pole teeth 111b (in FIG. 2, twelve pole teeth) are formed at an equal interval. The inner yoke 111 is formed with a dowel 111c and a hole 111d. The dowel 111c is a convex portion. The hole 111d is a concave portion into which the dowel 111c is engaged. At a portion of the outer peripheral edge of the circular shape of the inner yoke 111, a first notch 111g, a central cutout 111f (a second cutout), and a second notch 111g are formed, thereby creating two protrusions 111e, which are disposed between the first notch 111g and the central cutout 111f, and between the second notch 111g and the central cutout 111f, respectively. The dowell 111c (the convex portion) is arranged at a position proximate a gap between two neighboring pole teeth of the inner yoke, as shown, and the dowel 111c substantially aligns with a side edge of one of the two neighboring pole teeth. The dowel 111c and the hole 111d are formed so as to have a positional relationship of a line symmetry with respect to a center line y (FIG. 4). As shown, the pole teeth 111b are arranged in non-symmetrical relationship with respect to the central line y.

(Assembly Procedure and Detailed Structure)

Hereinafter, an assembly procedure of the PM stepping motor 100 and a detailed structure thereof will be described. First, the bobbin 112 around which the coil 113 is wound is placed in an annular space between the cylindrical portion 110b and the pole teeth 110d of the outer yoke 110 shown in FIG. 3. Then, two protrusions 111e of the inner yoke 111 are engaged with the cutout 110h of the outer yoke 110 to which the bobbin 112 is incorporated. Further, the outer peripheral edge of the inner yoke 111 is engaged with the stepped portion 110g of the outer yoke 110. At this time, when the protrusions 111e of the inner yoke 111 are engaged with the cutout 110h of the outer yoke 110, the positioning of the inner yoke 111 to the outer yoke 110 is performed. Here, when the inner yoke 111 is engaged with the outer yoke 110, the pole teeth 111b of the inner yoke 111 and the pole teeth 110d of the outer yoke 110 are engaged alternately in the circumferential direction via a predetermined space. The coil 113 wound around the bobbin 112 is placed on the outside of the pole teeth 110d, 111b. Then, a terminal 114 formed integrally with the bobbin 112 protrudes to the outside through the cutout 110h of the outer yoke 110.

Further, a plurality of protrusions 112a protruding in an axial direction are formed on a flange of the bobbin 112 by an integral molding. As the protrusions 112a are engaged with the positioning holes 110e formed on the bottom plate portion 110a of the outer yoke 110, the positioning of the bobbin 112 to the outer yoke 110 is performed.

Similar to the A-phase stator 102, the B-phase stator 103 is configured by the cup-shaped outer yoke 110 made of soft magnetic material (e.g., a cold-rolled steel plate, an magnetic steel plate and so on), the disc-shaped inner yoke 111 made of soft magnetic material (e.g., a cold-rolled steel plate, an magnetic steel plate and so on), the bobbin 112 molded from insulative resin and the coil 113 wound around the bobbin 112. Since the assembly structure of the B-phase stator 103 is the same as the A-phase stator 102, a description thereof is omitted.

The A-phase stator 102 and the B-phase stator 103 are joined to each other. Specifically, the dowel 111c formed on the inner yoke 111 of the A-phase stator 102 is engaged with the hole 111d formed on the inner yoke 111 of the B-phase stator 103. The dowel 111c formed on the inner yoke 111 of the B-phase stator 103 is engaged with the hole 111d formed on the inner yoke 111 of the A-phase stator 102. In this process, the A-phase stator 102 and the B-phase stator 103 are joined in a back to back relationship. Here, when joining the A-phase stator 102 and the B-phase stator 103, positioning is performed such that an electrical angle is different by 90° phase. After the A-phase stator 102 and the B-phase stator 103 are joined in a positioned state, the A-phase stator 102 and the B-phase stator 103 are fixed to each other by welding.

Then, for example, the bearing 105 (e.g., oil-impregnated sintered bearing) is attached on the center of a disc-shaped rear plate 115 made of iron plate (e.g., cold-rolled steel plate). The rear plate 115 having the bearing 105 attached thereon is fixed to the bottom plate portion 110a of the outer yoke 110 of the B-phase stator 103. Incidentally, the rear plate 115 is not limited to the iron plate.

Here, for the fixing of the rear plate 115 to the bottom plate portion 110a, the protrusion 110f formed on the bottom plate portion 110a is engaged with a hole formed on the rear plate 115 and positioning is performed such that the bearing 105 and the opening 110c of the B-phase stator 103 are arranged so as to have a predetermined concentricity. In this state, the rear plate 115 and the bottom plate portion 110a are fixed to each other. As a fixing manner, welding, adhering and crimping can be used, for example.

Next, the rotor 104 is placed inside the stator 101. One side of the shaft 107 is inserted into the bearing 105 attached to the rear plate 105. Then, the other side of the shaft 107 is inserted into the bearing 106 attached to a front plate 116. The front plate 116 is fixed to the bottom plate portion 110a of the outer yoke 110 of the A-phase stator 102. Similar to the method of fixing the rear plate 115, for the fixing of the front plate 116 to the bottom plate portion 110a of the outer yoke 110 of the A-phase stator 102, the protrusion 110f formed on the bottom plate portion 110a of the outer yoke 110 is engaged with a hole formed on the front plate 116 and positioning is performed so that the bearing 106 and the opening 110c of the A-phase stator 102 are arranged so as to have a predetermined concentricity. In this state, the front plate 116 and the bottom plate portion 110a are fixed to each other. As a fixing manner, welding, adhering and crimping can be used, for example.

(Characteristics)

Next, characteristics feature of the PM stepping motor 100 will be described. Since the A-phase stator 102 has the same structure as the B-phase stator 103, the following description will be made on the A-phase stator 102.

Figure 8:
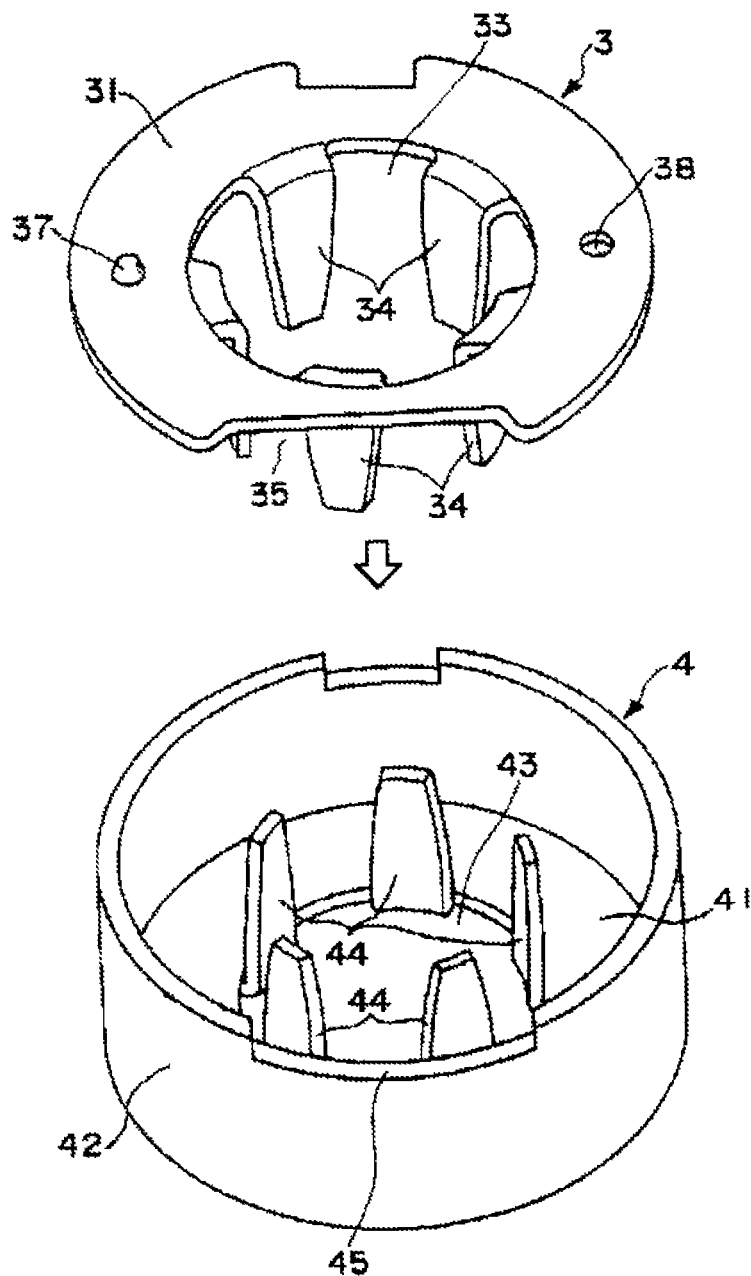
FIG. 8 is a view showing an inner yoke of the related-art PM stepping motor shown in FIG. 7.

As shown in FIG. 2, the dowel 111c and the hole 111d are respectively formed on the disc-shaped inner yoke 111. In the related-art PM stepping motor shown in FIG. 8, the protruding portion 37 as a dowel and the hole 38 are respectively formed at positions of θ=90° with respect to a center line passing through the cutout 35. Accordingly, the protruding portion 37 as a dowel and the hole 38 are arranged at an angular position of 180°.

On the contrary, in the inner yoke 111 of the PM stepping motor 100 according to the illustrative embodiment, as shown in FIG. 4, the dowel 111c and the hole 111d are arranged at positions of θ=62° with respect to the center line passing through the cutout 35, respectively.

When the PM stepping motor is driven, an electromagnetic force for causing mutual attraction between the rotor and the pole teeth of the stator is generated. This electromagnetic force deforms the stator into a polygonal shape. The deformation due to the electromagnetic force changes with time, thereby causing vibration. This vibration is classified by different values determined for each vibration mode. This vibration mode can be analyzed by an analysis method referred to as a mode analysis using a computer simulation.

Figure 5:
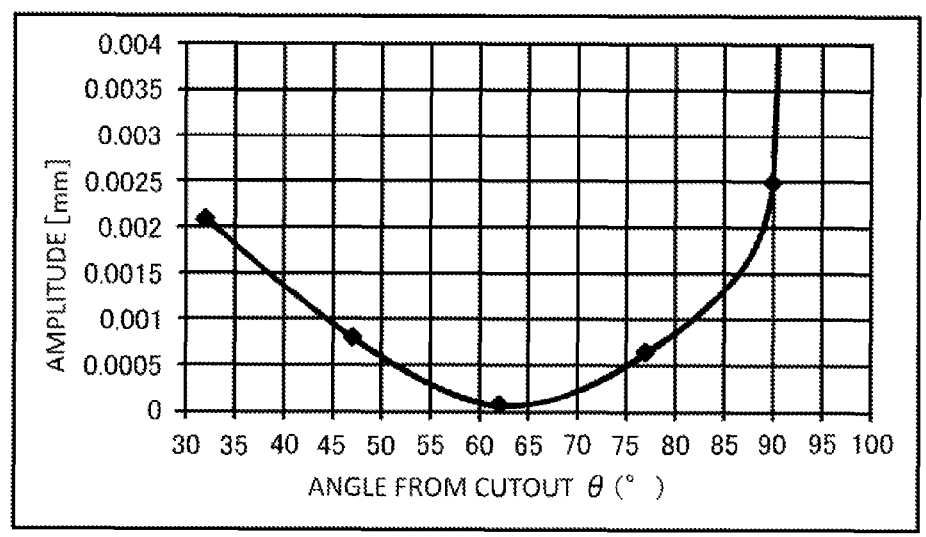
FIG. 5 is a graph showing a relationship between vibration, and a dowel and a hole which are formed on the inner yoke.
Figure 6:
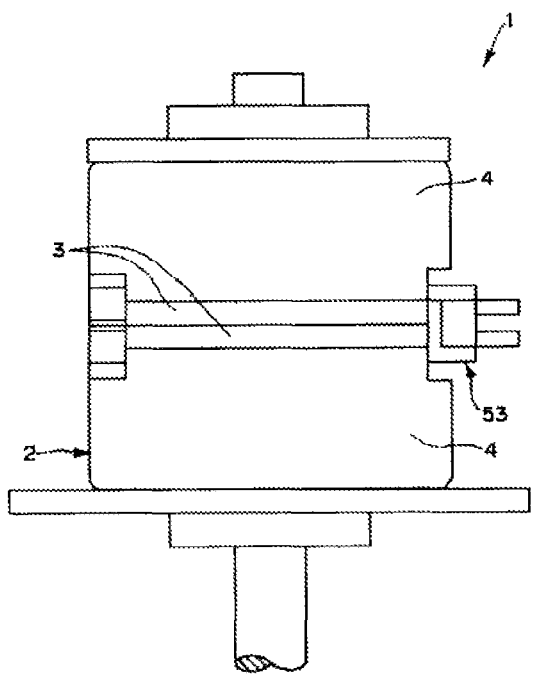
FIG. 6 is a view showing a related-art PM stepping motor.
Figure 7:
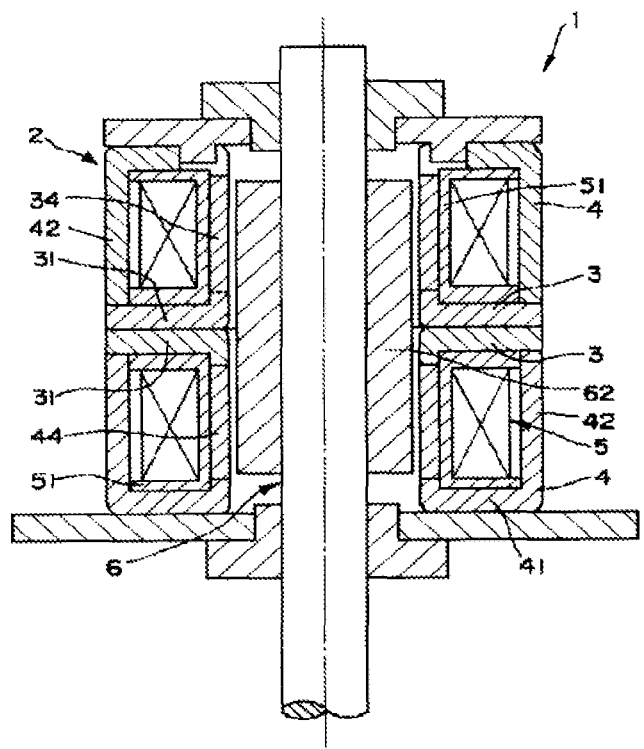
FIG. 7 is a sectional view showing the related-art PM stepping motor shown in FIG. 6.

FIG. 5 is a view showing a relationship between the vibration, and the dowel 111c and the hole 111d which are formed on the inner yoke 111. Here, the center line y passes through a center point O of the inner yoke 111 and a center point between two protrusions 111e of the inner yoke 111. An angle θ formed between the center line y and a line passing through the dowel 111c from the center point O of the inner yoke 111 is equal to an angle θ formed between the center line y and a line passing through the hole 111d from the center point O. The dowel 111c and the hole 111d are arranged in a positional relationship of a line symmetry with respect to the center line y.

Here, the angle θ to determine the positions of the dowel 111c and the hole 111d, which are formed on the inner yoke 111, is varied in 32°, 47°, 62°, 76°, 90° and then the vibration of the inner yoke 111 generated in each condition is analyzed by the mode analysis. The results are shown in FIG. 5. Regarding the positions of the dowel 111c and the hole 111d, when the angle θ is equal to 90°, the stepping motor has the same structure as the related-art PM stepping motor shown in FIG. 8.

As shown in FIG. 5, regarding the positions of the dowel 111c and the hole 111d, the vibration generated abruptly increases when the angle θ is equal to 90°. In the vicinity of 90°, amplitude of vibration abruptly increases even when the angle θ slightly increases.

On the other hand, when the angle θ is in the range of 30°<θ<90°, it is possible to reduce the amplitude of vibration, as compared to the case where the angle θ is equal to 90° as in the related-art PM stepping motor. Further, it is found from FIG. 5 that the vibration can be further suppressed when the angle θ is in the range of 40°<θ<85° and the vibration can be still further suppressed when the angle θ is in the range of 55°<θ<70°. Here, it is found from FIG. 5 that the increase in amplitude according to the increase in angle becomes significant when the angle θ is equal to or greater than 85°.

Accordingly, as compared to the related-art PM stepping motor, the amplitude of vibration can be reduced by positioning the dowel 111c and the hole 111d which are formed on the inner yoke 111, closer to the cutout 110h of the outer yoke 110 through which the terminal 114 protrudes to the outside, and by setting the angle θ formed between the center line y passing through a center point of two protrusions 111e of the inner yoke 111 and the positions of the dowel 111c and the hole 111d in the range of 30°<θ<90°. As a result, the vibration can be suppressed and therefore the noise can be reduced.

The present invention is not limited to respective illustrative embodiments described above, but includes various modifications which can be conceived by those skilled in the art. Further, effects of the present invention are not limited to the above-described effects. Namely, various additions, changes and partial omissions can be made without departing from the conceptual idea and spirit of the present invention which can be derived from the contents as defined in the claims and equivalents thereof.

What is claimed is:
1. A PM stepping motor comprising:
a two-phase stator which includes a first stator and a second stator arranged in an axial direction, wherein each of the first stator and the second stator configures one phase and includes an outer yoke having a plurality of pole teeth, an inner yoke having a plurality of pole teeth, and a coil wound around a bobbin; and a rotor which is rotatably supported inside the two-phase stator, wherein each of the first and second stators is formed with one set of a convex portion and a concave portion which have an engagement structure, wherein the inner yoke of the first stator and the inner yoke of the second stator are joined, the convex portion formed on the inner yoke of the first stator being engaged with the concave portion formed on the inner yoke of the second stator, wherein each of the outer yoke of the first stator and the outer yoke of the second stator is formed with a first cutout through which a terminal formed integrally with the bobbin protrudes outside, wherein each of the inner yoke of the first stator and the inner yoke of the second stator is formed at a second cutout of an outer peripheral edge thereof with two protrusions which are engaged with the first cutout of the outer yoke of the corresponding one of the first stator and the second stator, and wherein positions of the convex portion and the concave portion of the inner yokes of the first and second stators are arranged in a line symmetrical relationship with respect to a center line passing through a center point of the inner yokes and a center position between the two protrusions, and an angle $\theta$ formed between each of the positions and the center line is in a range of $55°<\theta<70°$.

2. The PM stepping motor according to claim 1, wherein only the one set of the convex portion and the concave portion is formed in the inner yoke of the first stator, and wherein only the one set of the convex portion and the concave portion is formed in the inner yoke of the second stator.

3. The PM stepping motor according to claim 1, wherein the protrusion is engaged with the first cutout of the outer yoke.

4. The PM stepping motor according to claim 1, wherein the outer peripheral edge is engaged with a stepped portion of the outer yoke.

5. The PM stepping motor according to claim 1, wherein when the angle $\theta$ increases from 55 degrees to 60 degrees, a vibration amplitude of the PM stepping motor decreases.

6. The PM stepping motor according to claim 1, wherein when the angle $\theta$ increases from 65 degrees to 70 degrees, a vibration amplitude of the PM stepping motor increases.

7. A PM stepping motor comprising:

a first stator including an inner yoke and a plurality of pole teeth formed at an equal interval, and a second stator including an inner yoke and a plurality of pole teeth, and aligned coaxially with the first stator, wherein a convex portion formed in face of the inner yoke of the first stator is engaged with a concave portion formed in a face of the inner yoke of the second stator, a concave portion formed in the face of the inner yoke of the first stator is engaged with a convex portion formed in the face of the inner yoke of the second stator, positions of the convex portion and the concave portion of each of the inner yokes of the first and second stators are arranged in a symmetrical relationship with respect to a central symmetry line passing through a center axis of the inner yokes, the pole teeth of the first stator are arranged in non-symmetrical relationship with respect to the central symmetry line, an angle formed between a position of each of the concave portions and the symmetry line is in a range of $40°<\theta<85°$, and an angle formed between a position of each of the convex portions and the symmetry line is in a range of $40°<\theta<85°$.

8. The PM stepping motor according to claim 7, wherein a part of the convex portion of the first stator aligns with a side edge of one of the plurality of pole teeth of the first stator in a radial direction.

9. The PM stepping motor according to claim 7, wherein one part of the convex portion of the first stator aligns with a side edge of a gap between two adjacent pole teeth of the first stator in a radial direction, and one of the two adjacent pole teeth of the first stator is farther from the central symmetry line than another of the two adjacent pole teeth.

10. The PM stepping motor according to claim 7, wherein the concave portion of the first stator aligns with a side edge of a gap between two adjacent pole teeth of the first stator in a radial direction.

* * * * *